United States Patent [19]

Moore

[11] Patent Number: 4,627,321

[45] Date of Patent: Dec. 9, 1986

[54] PUNCH PRESS MACHINE INCLUDING A WORKPIECE POSITIONING MEANS WITH A QUICK CHANGE DIE HOLDER, PUNCH AND STRIPPER UNIT

[76] Inventor: Scott B. Moore, 2401 S. 6th St., Springfield, Ill. 62703

[21] Appl. No.: 807,138

[22] Filed: Dec. 10, 1985

[51] Int. Cl.⁴ .......................... B26F 1/14; B21D 28/34
[52] U.S. Cl. ........................................ 83/468; 83/698
[58] Field of Search .................. 83/468, 698; 72/448, 72/446; 100/918

[56] References Cited

U.S. PATENT DOCUMENTS

| | | | |
|---|---|---|---|
| 3,495,495 | 2/1970 | Berry | 83/698 X |
| 4,552,050 | 11/1985 | Grefe | 83/698 X |

Primary Examiner—James M. Meister
Attorney, Agent, or Firm—Edwin E. Greigg

[57] ABSTRACT

This invention sets forth a workpiece adjusting mechanism, a quick release and removal die holder and a punch and stripper unit which can be adjusted and removed quickly for saving production time.

6 Claims, 5 Drawing Figures

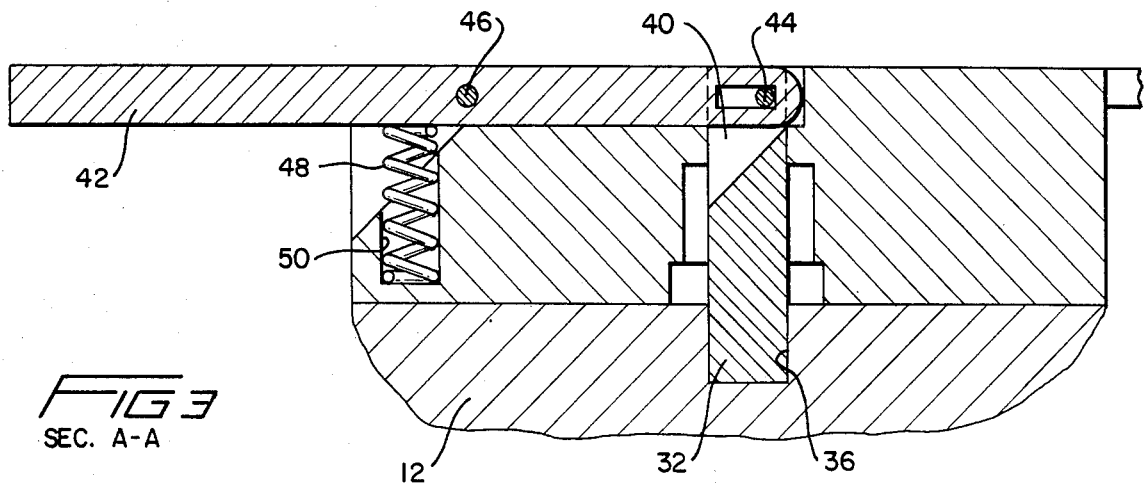
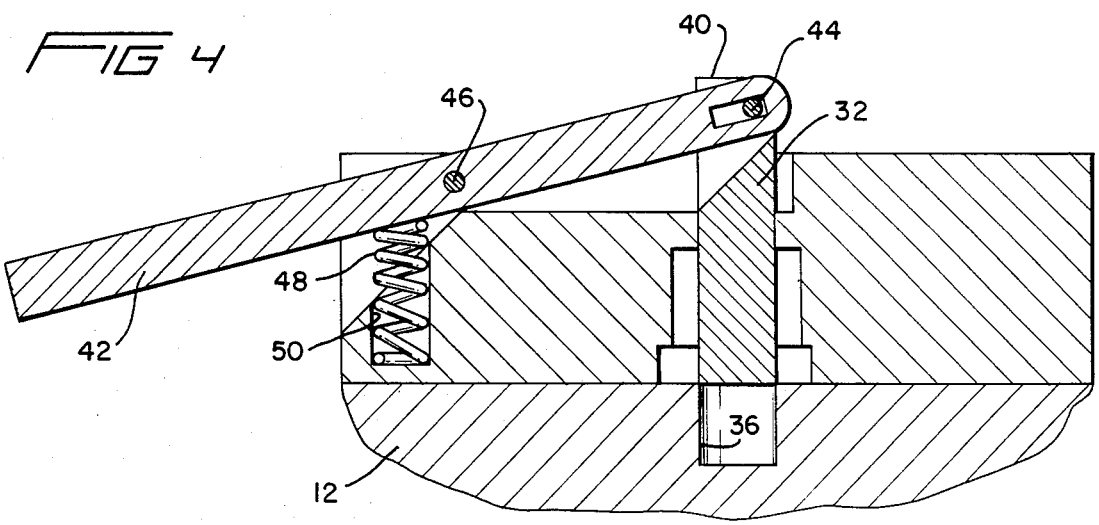
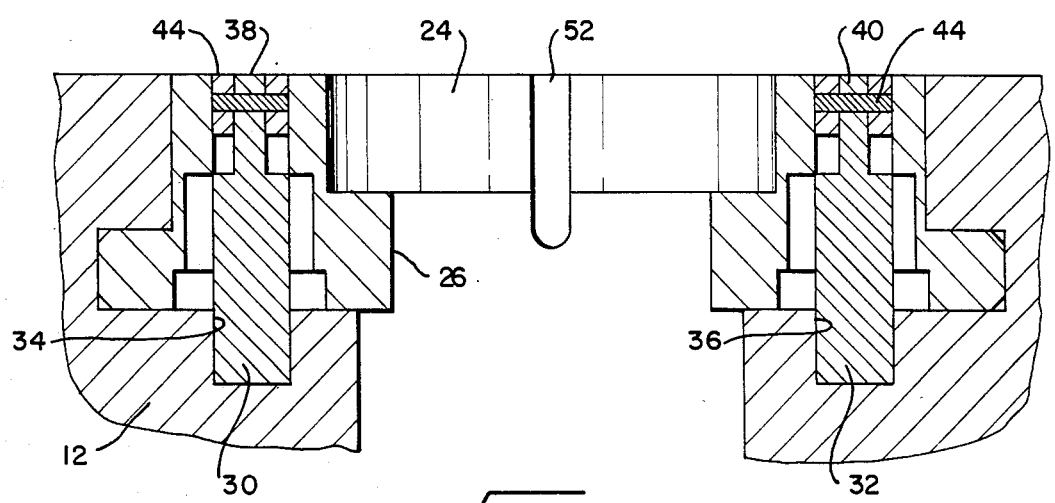

PUNCH PRESS MACHINE INCLUDING A WORKPIECE POSITIONING MEANS WITH A QUICK CHANGE DIE HOLDER, PUNCH AND STRIPPER UNIT

BACKGROUND OF THE INVENTION

This invention relates to punch press machines and more particularly to a workpiece positioning means and a quick change die support and punch and stripper unit.

In mass production of punched parts everyone knows that down time of the punch press for set-up time to change dies etc., is lost time which costs money. Heretofore, various apparatus have been used for positioning a sheet of material for punching and different die and punch means have been used by which the dies and punch can be changed. Usually changing the die and punch requires considerable time and effort during removal and replacement of the die and punch.

OBJECT AND SUMMARY OF THE INVENTION

It is therefore an object of the invention to provide a die support means which will cut costs and increase production due to set-up time.

Another object is to provide a workpiece positioning means which will accurately position a workpiece for punching holes.

Still another object is to provide a workpiece position means which is safe, accurate and quick in set-up and use.

Yet another object is to provide a quick removal punch and tripper unit arrangement which is easy to install and remove from a punch press.

Other objects and advantages will become obvious from a description of the drawings which are illustrative only.

BRIEF DESCRIPTION OF THE DRAWINGS

FIG. 3 illustrates a cross-sectional view along line A—A of FIG. 2 illustrating a quick release means for the die holder in the installed position.

FIG. 4 is a partial cross-sectional view as shown in FIG. 3 in which the quick release for the die holder is in a position for removal of the die holder.

FIG. 5 is a partial cross-sectional view illustrating both release pins for the die holder in their installed position.

DETAILED DESCRIPTION

Figure 1:
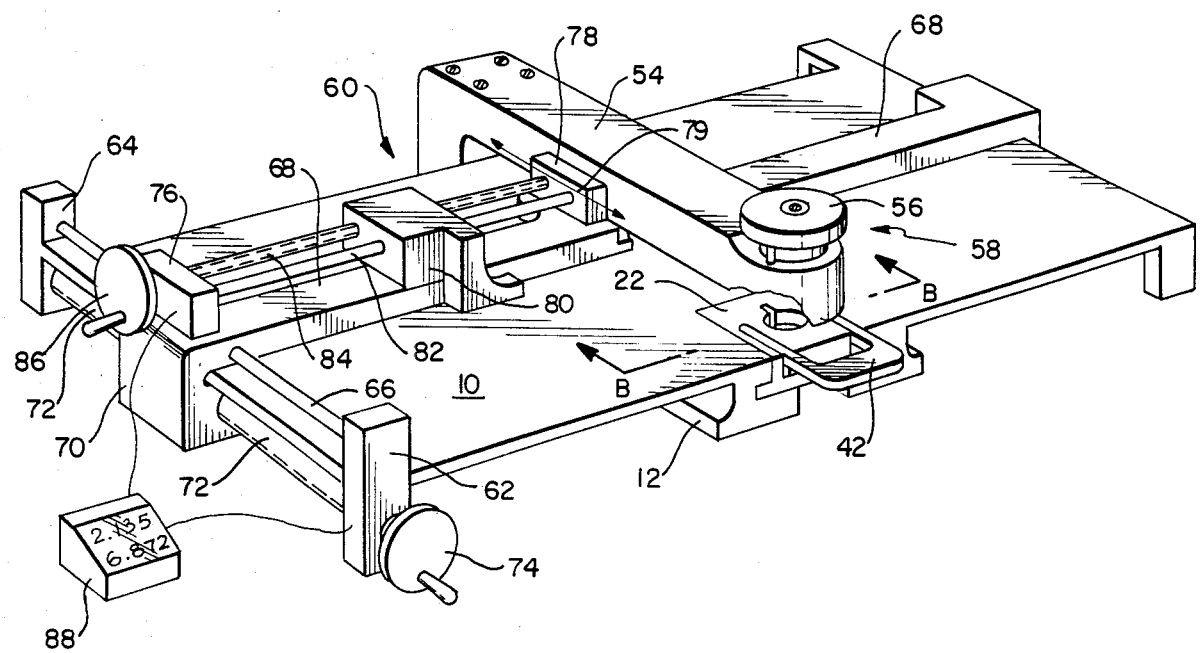
FIG. 1 illustrates a perspective view illustrating the relative parts.
Figure 2:
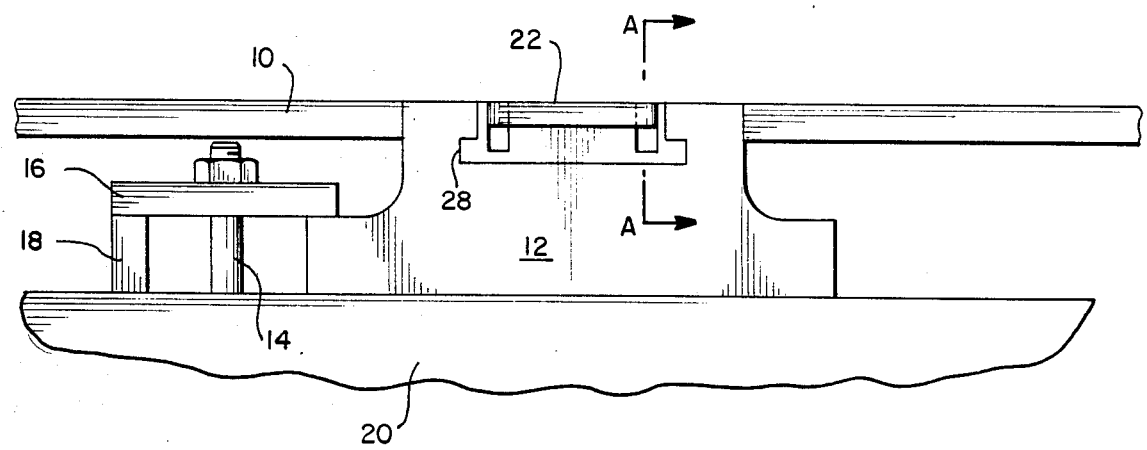
FIG. 2 illustrates an end view which more specifically illustrates the manner of securing the quick change punch and die arrangement to an open back punch press.

Now referring to the drawings there is shown a quick punch machine assembly which may be secured to an open back inclinable punch press. The assembly includes a horizontal workpiece supporting table 10 which is provided with a central T-shaped downwardly extending supporting connector 12 by which the supporting table 10 is secured to the punch press. The supporting table is clamped in place by a fixture including a bolt 14 that passes through a plate 16, the ends of which rest on the T-shaped connector and on a support plate 18 which rests on the punch press 20 from which the bolt extends. The forward end of the T-shaped connector 12 is in itself provided with a T-shaped cut-out for reception of a quick release removable die holder 22. The quick release die holder is formed to make a cut of any desired shape and size which is determined by the die placed in the die holder. The die holder 22 is shown with a cylindrical stepped hole 24 within which the die is secured. The waste material drops out through the hole 26 in the die holder 22 and the hole 26 is in alignment with a passage in the support 12.

The die holder 22 is shown in top view as somewhat rectangular with the T-shaped bottom 28 which slides into matching slots in the support 12. The quick release die holder includes separate oppositely disposed pins 30 and 32 which extend into blind bores 34 and 36 respectively in the support 12. The top of the pins are ground down or formed in any suitable manner with central thin extensions 38 and 40 by which they are secured at their ends to a U-shaped handle 42 by pins 44. The U-shaped handle 42 pivots about pins 46 near the front of the die holder 22 and is forced upwardly by springs 48 fixed in blind bores 50. In installing the die holder in the support 12, the die holder is placed in the cylindrical hole 24 and the die holder is slid into the support opening which receives the die holder. The pins 30 and 32 are held in their up position during being pushed to their fixed position. As soon as the die holder is in its proper position, the pins 30 and 32 will be forced into the blind bores 34 and 36 in the support 12 by the force of the springs 50 which apply a force on the U-shaped handle. The cylindrical hole 24 that receives the die is provided with a slot 52 into which a shoulder on the die fits which secures the die in place. The die could be formed with a slot and the shoulder could be on the cylindrical wall. In such a construction the die holder can be removed simply by pressing down on the handle to raise the pins and then the die holder can be removed by sliding from the slots and the die is quickly replaced by another die and the die holder is then replaced.

As shown in FIG. 1, an arm 54 is secured at the back to the workpiece supporting plate 10 and the support 12 and forms with the support 12, a U-shape, with the arm 54 spaced above the workpiece supporting plate 10. The arm 54 extends such that the front end is positioned above the die holder. The front end of arm 54 is formed with a cylindrical opening in which the punch and stipper unit 56 is secured by two screws 58. Therefore, the punch and stripper unit can be quickly changed by removal of the two screws 58 which permits removal of the punch and stripper unit which is placed by another punch and stripper unit in reverse order.

In order to position the workpiece in a desired position on an x, y axis, relative to the punch and die, there is provided an adjustable stop 60. As shown, the left end of the workpiece supporting plate 10 is provided with parallel extending bars 62 and 64 with a portion above and below the workpiece supporting plate 10. A supporting rod 66 above the plate 10 supports the bars 62 and 64 in their spaced position. A cross bar 68 extends across the table 10 under the arm 54 and is provided at its left end with a screw case 70 that fits along the end surface of table 10 and has an extension below table 10 through which a worm screw 72 is threaded. The worm screw 72 has a non-threaded end that fits into end bar 64 and a non-threaded end that fits through the end bar 62. An input wheel 74 is provided for rotating the screw 72. As the screw 72 is rotated, the cross bar 68 is moved forward or backward depending on the rotation of the screw. The cross bar 68 is provided with support 76 above the left end of the cross bar and support 78 which slides long the arm 54 as the cross bar is moved back or forward as shown by the arrow 79. An adjustable stop 80 is positioned above cross bar 68 between the supports 76 and 78 and is adjustable along rod 82 by use of worm screw 84 by use of an input wheel 86. The workpiece can be adjusted forward and backwardly by rotation of wheel 74 which moves the entire cross bar and along with the cross bar the adjustable stop. For side-wise adjustment, the adjustable stop is moved between the left end of plate 10 and the arm 54 by wheel 86 and rotation of the worm screw 84. For quick adjustment small motors could be substituted for the wheels 74 and 86. Also, for determining the position of the adjustable stop, a position indicator 88 may be provided which is connected mechanically to the worm screws and rotated thereby as the worm screws are rotated.

In use, the table top support, die holder, die punch arm, punch and stripper unit, and adjustable stop mechanism can be preformed and secured to an existing punch press by use of support means such as 14, 16 and 18 or any other support means, then the device will be ready for use. The die may be placed in the die holder and then the die holder placed in the support 12. The matching punch and stripper unit is placed in the punch holder in arm 54 and the device is ready for operation.

Where desired the device as above set forth could be made as a part of the punch press so that the T-support 12 is a part of the punch press. Then only the die holder and punch and stripper units are changed as necessary.

The only thing required to replace the die holder is to press the lever 42 down which raises the pins 30 and 32 from the blind bores 34 and 36. Then the die holder may be removed be a sliding motion from the support 12. The die is changed and the die holder is quickly replaced without the use of any tools.

The punch and stripper unit is replaced by the removal of two screws which require the minimum use of any tools.

As shown in FIGS. 3 and 4, the die holder is provided with an angular slot below the handle arm so that the arm can be moved downwardly without any obstruction. Also, the upper end of the pins 30 and 32 are cut at a slope for the same reason.

A workpiece adjusting apparatus has been shown in U.S. Pat. No. 4,434,693. However, these are complicated and do not provide the same support for the workpiece as set forth herein.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the united states is:

1. A punch press machine assembly including a workpiece supporting table and a table support means which comprises:

an opening in said supporting table and said table support for receiving a die holder, said die holder including a die opening for receiving a die therein, oppositely disposed pins on opposite sides of said die opening, and a U-shaped handle connected to said oppositely disposed pins for lifting and lowering said pins for removal and replacement of said die holder.

2. A punch press machine assembly as set forth in claim 1, wherein:

said table support includes blind bores for receipt of said pins when said die holder is properly placed in said opening in said supporting table and said table support.

3. A punch press machine assembly as set forth in claim 2, which includes spring means for forcing said U-shaped handle in an upward direction for movement of said pins into said blind bores.

4. A punch press machine assembly as set forth in claim 3, which includes:

a support arm, a punch and stripper unit secured to said support arm above said die holder.

5. A punch press machine assembly as set forth in claim 4, which includes:

x and y adjustable back stops, said x and y adjustable back stops including a cross arm that extends along said supporting table under said support arm, an adjustable stop that moves along said cross arm, means for moving said cross arm back and forth perpendicular to said supporting arm, and means for moving said adjustable stop along said cross arm toward and away from said supporting 6. A punch press machine assembly as set forth in claim 5, which includes:

means for indicating different positions of said x and y adjustable back stops relative to said supporting table and said die holder.

* * * * *